United States Patent [19]
Baczynsky

[11] 3,984,855
[45] Oct. 5, 1976

[54] TWIN CAMERA SHOULDER-CHEST-POD

[76] Inventor: Mark Baczynsky, 82 Pine Grove Ave., Kingston, N.Y. 12401

[22] Filed: Mar. 21, 1975

[21] Appl. No.: 560,857

[52] U.S. Cl. ............................. 354/293; 224/5 V; 248/183
[51] Int. Cl.² ........................................ G03B 15/00
[58] Field of Search ............ 224/5 V, 5 R, 5 A, 5 B; 354/292, 293, 294; 248/183, 184, 185, 82 R, 176, 360, 359

[56] References Cited
UNITED STATES PATENTS

| 765,980 | 7/1904 | Mercier | 354/293 |
|---|---|---|---|
| 2,614,471 | 10/1952 | Markowitz | 354/293 |
| 3,074,338 | 1/1963 | Hanscom | 354/293 X |
| 3,749,900 | 7/1973 | Jonas et al. | 248/183 X |

FOREIGN PATENTS OR APPLICATIONS

| 1,203,250 | 8/1970 | United Kingdom | 354/293 |

*Primary Examiner*—Robert J. Spar
*Assistant Examiner*—Donald W. Underwood
*Attorney, Agent, or Firm*—Allison C. Collard

[57] ABSTRACT

A twin camera shoulder-chest-pod carrier comprising an intermediate connecting bar, and a first bracket integrally connected to one end of the connecting bar and a second bracket integrally connected to the other end of the connecting bar. Connecting members are provided for releasably affixing a first camera to the first bracket and a second camera to the second bracket.

4 Claims, 5 Drawing Figures

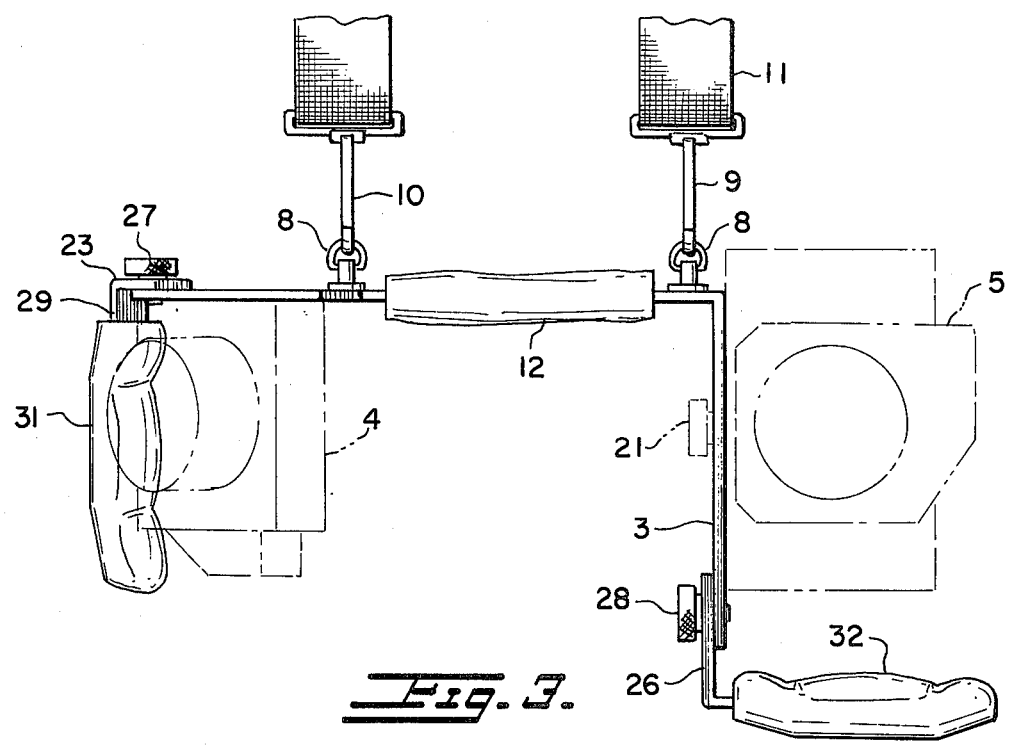
Fig. 3.
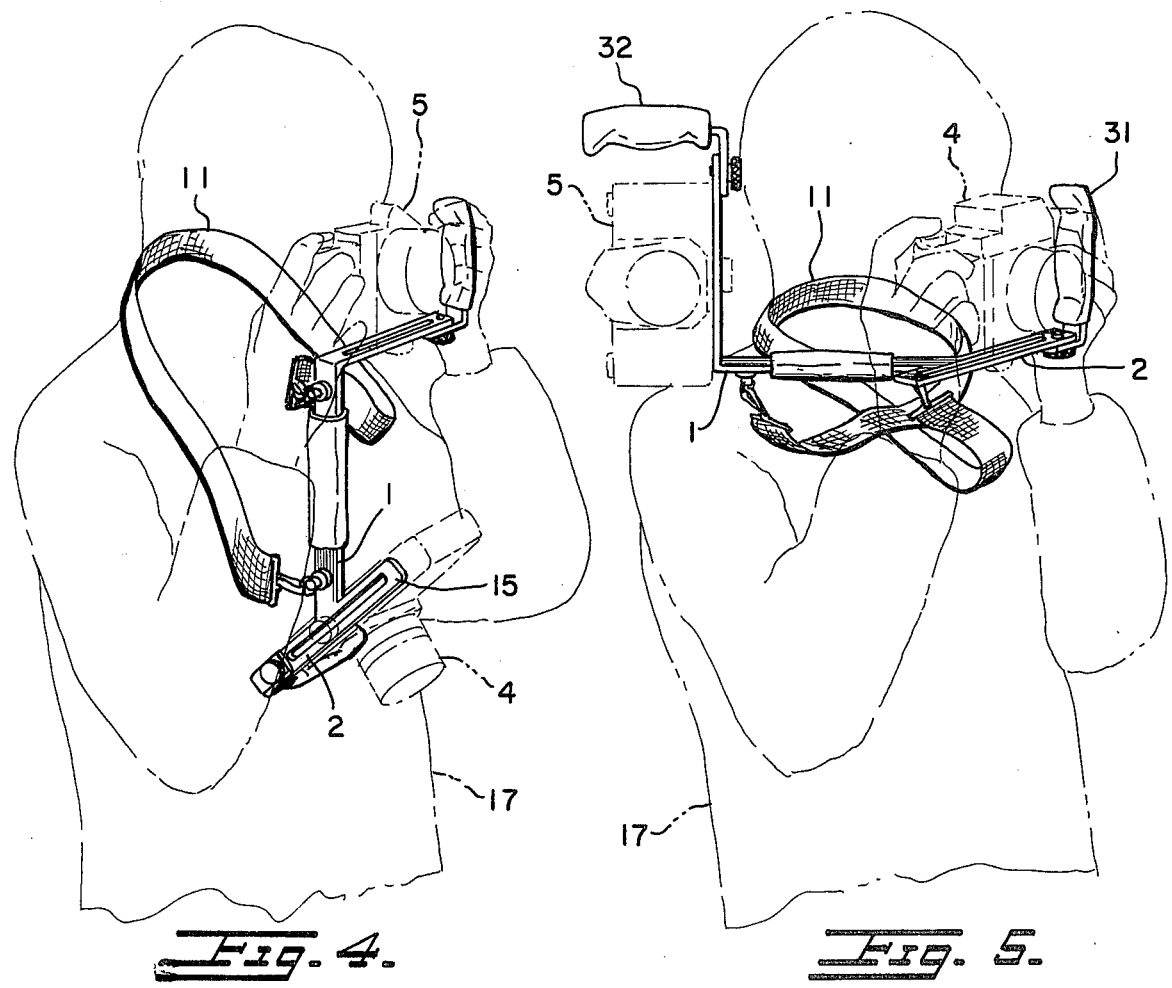
Fig. 4.
Fig. 5.

TWIN CAMERA SHOULDER-CHEST-POD

The present invention relates to a twin camera shoulder-chest-pod carrier.

A photographer frequently is required to carry two cameras such as one providing color film and another providing black and white or simply two different cameras. In such situations the photographer desires to switch quickly and conveniently from one camera to the other.

Although there are many supports, brackets, holders and the like presently on the market, there is still no device that is of widespread acceptance on the basis of ability to achieve the above-mentioned objects.

Accordingly, it is an object of the present invention to provide a handy twin camera shoulder-chest-pod carrier which combines many functions into one light, compact, and inexpensive unit.

It is another object of the present invention to provide a twin camera shoulder-chest-pod carrier comprising an intermediate connecting bar and a first bracket integrally connected to one end of the connecting bar and a second bracket integrally connected to the other end of the connecting bar, and means for releasably connecting a first camera to the first bracket and means for connecting a second camera releasably to the second bracket.

It is yet another object of the present invention to provide a twin camera shoulder-chest-pod carrier in accordance with the previously mentioned objectives wherein the first bracket has ends thereof and is connected to the connecting bar between its ends thereof, and the second bracket is connected at one of its ends to the other end of the connecting bar.

It is yet another object of the present invention to provide a twin camera shoulder-chest-pod carrier in accordance with the previously mentioned objectives wherein the first bracket and the second bracket are oriented substantially cross-wise relative to each other.

It is yet another object of the present invention to provide a twin camera shoulder-chest-pod carrier in accordance with the previously mentioned objectives wherein the second bracket forms an L-shaped member with the connecting bar.

It is yet another object of the present invention to provide a twin camera shoulder-chest-pod carrier in accordance with the previously mentioned objectives wherein the first bracket is coplanar relative to the connecting bar.

It is yet another object of the present invention to provide a twin camera shoulder-chest-pod carrier in accordance with the previously mentioned objectives wherein the first bracket is inclined relative to the connecting bar and extends in a rearward direction in a portion thereof at an obtuse angle relative thereto.

It is yet another object of the present invention to provide a twin camera shoulder-chest-pod carrier in accordance with the previously mentioned objectives wherein the second bracket member extends vertically downwardly relative to a horizontal orientation of the connecting bar.

It is yet another object of the present invention to provide a twin camera shoulder-chest-pod carrier in accordance with the previously mentioned objectives wherein the brackets each form a slot extending longitudinally along the brackets, and the connection means comprise screws adapted to be slidably disposed in the longitudinal slots and adapted for releasably securing a camera thereto against the brackets.

It is yet another object of the present invention to provide a twin camera shoulder-chest-pod carrier in accordance with the previously mentioned objectives further comprising handle members releasably pivotably attached to a rear end of the first bracket and to a free end of the second bracket, respectively.

It is yet another object of the present invention to provide a twin camera shoulder-chest-pod carrier in accordance with the previously mentioned objectives further comprising means for connecting a strap to adjacent the ends of the connecting bar.

The device in accordance with the present invention combines many functions into one light weight compact unit. It allows the photographer to carry, for example, two 35mm cameras conveniently, and offers quick interchangeability between the cameras in a time less than 2 seconds. Simultaneously, it provides exceptionally solid support by means of the shoulder or chest of the user, the weight of the cameras providing the necessary stability and balance in cooperation with the structure of the twin camera shoulder-chest-pod of the present invention.

The simplicity of the device lends itself to economical mass production. For example the basic structure thereof can be made, although not limited thereto, out of a single piece of ⅛ inch aluminum alloy, or the like, or any other suitable rigid material. Since an ever increasing number of amateur and professional photographers own more than one camera, this device can be readily utilized.

Other objects and features of the present invention will become apparent from reference to the drawings, which disclose a preferred embodiment of the novel twin camera shoulder-chest-pod in accordance with the present invention, of which FIG. 1 is a perspective view of a twin camera shoulder-chest-pod in accordance with the present invention with two cameras illustrated in dot-dashed lines in attached position thereon;

FIG. 3 is a front view taken along the lines 3—3 of FIG. 2; and

FIGS. 4 and 5 are perspective views illustrating the use of the twin camera shoulder-chest-pod in selective operative positions with the operator taking pictures from one camera mounted on the unit in FIG. 4, and with the operator taking pictures from the other camera in FIG. 5.

Figure 1:
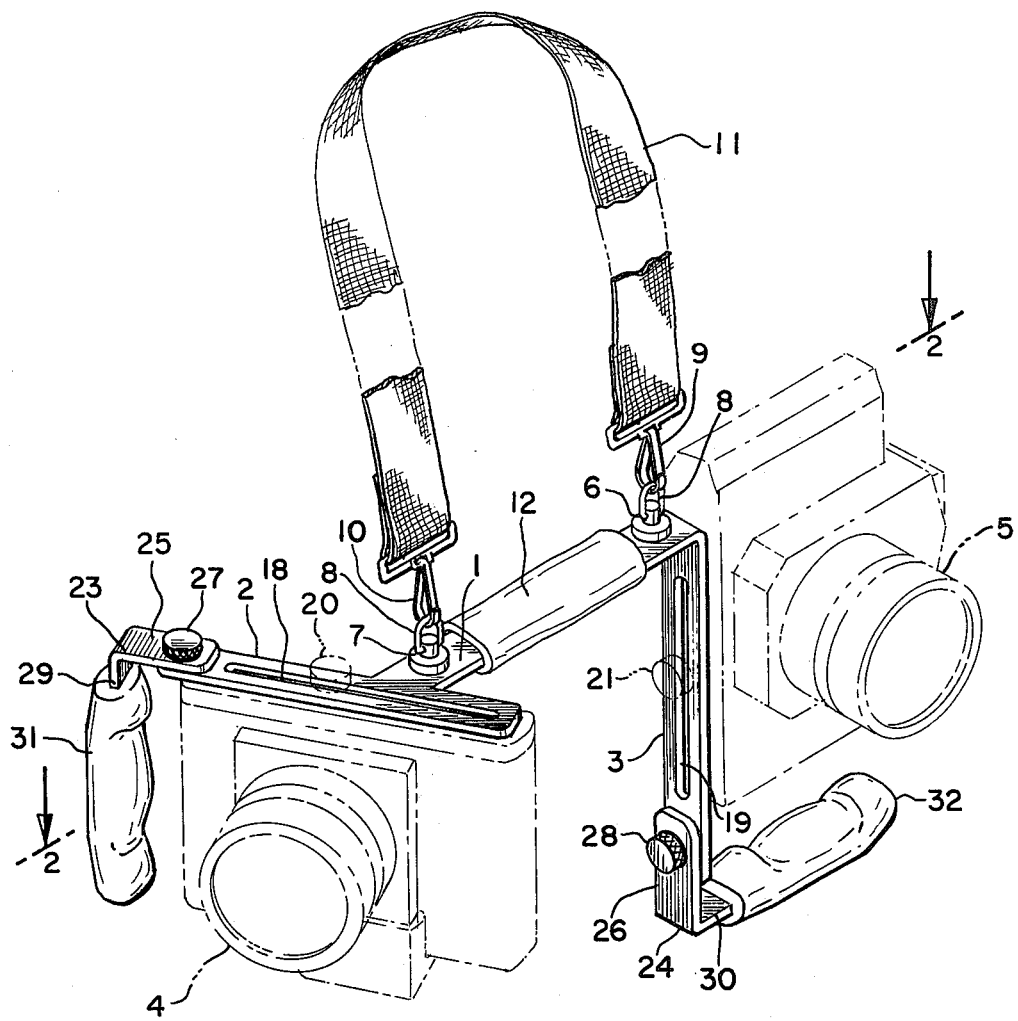

Referring now to the drawings, a twin camera shoulder-chest-pod in accordance with the present invention comprises a central intermediate connecting bar 1 integrally joined at one of its ends to an oblique bracket 2, and at its other end to a 90° bracket 3, the brackets 2 and 3 being adapted for respectively mounting thereto a first camera 4 and a second camera 5, as hereinafter described. The bar 1 as well as the brackets 2 and 3 may be formed of a single piece of ⅛ inch aluminum alloy or any other suitable rigid lightweight material and constitutes although not limited thereto, a substantially flat bar of a small thickness relative to both its width and its length.

Lugs 6 and 7 are mounted on intermediate connecting bar 1 adjacent the ends thereof. The lugs have pivotal loops 8 thereon which loops are respectively adapted to be connected to spring hooks 9 and 10 of a hand or neck strap 11. The neck strap 11 may be worn about the neck of the operator, with the intermediate connecting bar 1 extending horizontally across the front of the operator with the cameras 4 and 5 affixed to the brackets providing balance in the inoperative position disclosed in FIGS. 1 and 3. A plastic hand grip 12 is disposed on the intermediate connecting bar between the lugs 6 and 7, which hand grip may be made of plastic, rubber cushioning material or the like.

The bracket 2 is formed in the same plane as that of the bar 1, at an obtuse angle 13 relative to the bar 1 extending rearwardly relative toward the back of the operator, approximately at an angle of between 110°–135° although not limited thereto. The rearward extending portion 14 of the bracket 2 is substantially larger than the forward extending portion 15 of the bracket 2, the forward portion 15 and rearward portion 14 of the bracket 2 being integral and forming a straight bracket. Likewise the supplementary angle 16 formed between the forward portion 15 of the bracket 2 and the connecting bar 1 forms an acute angle 16.

Figure 2:
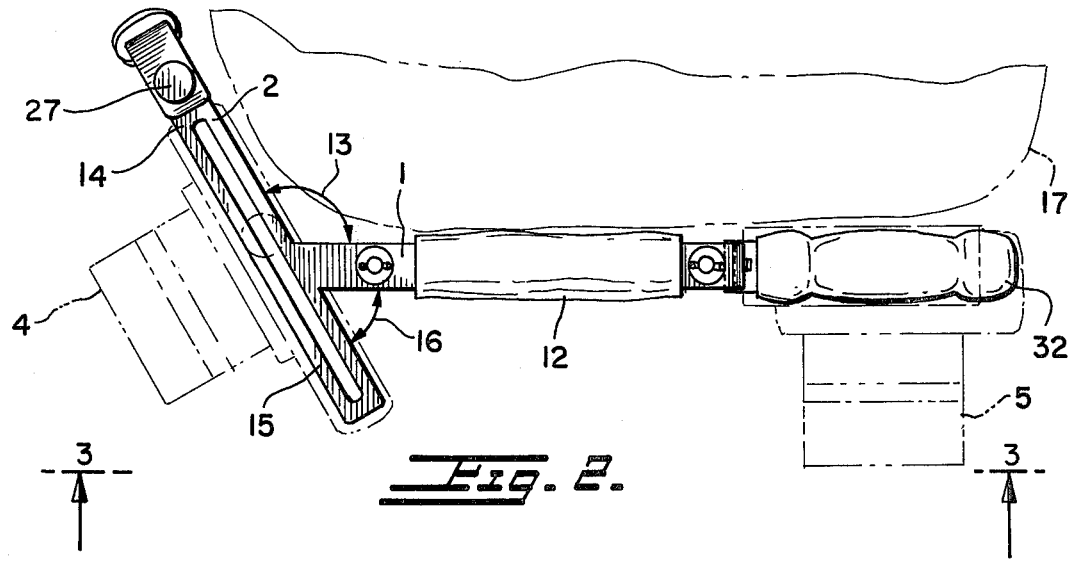
FIG. 2 is a section taken along the lines 2—2 of FIG. 1.

In the inopertive position of the cameras as well as the use position, the above mentioned relative dimensions of the bracket 2 and the angles relative to the bar 1 are extremely useful in the device in accordance with the present invention. As may be seen in FIG. 2, with reference to the body of the user designated in dot-dash lines 17, the bracket 2 at its back portion 14 extends along the user's right-hand-side with the camera 4 lying horizontally and substantially against the curving portion of the body between his right side and the front thereof, forming a nice closely hugging fit for the camera 4. On the other hand, the vertically disposed camera 5 lies straight and longitudinally with respect to the vertical position of a standing person. The small forward extending portion 15 of the bracket 2 is relatively short compared to the rear portion 14 and therefore does not interfere with the body of the user by not projecting substantially forward.

For connection of the cameras, each of the brackets 2 and 3 are respectively formed with bracket slots 18 and 19 extending along the longitudinal axis of the brackets and terminating therein adjacent, but spaced from the ends of the respective brackets. Standard camera retaining screws 20 and 21 are respectively adapted to extend through the slot from the top of bracket 2 in order to cooperatively secure thereto the camera 4 against the bottom of bracket 2; and on the other hand the screw 21 is adapted to extend from the side of the bracket 3 facing the opposite bracket 2 extending therethrough to the other side of the bracket 3 and there securing the camera 5. The camera retaining screws 20 and 21 are displacably movable along the bracket slots 18 and 19 to accommodate cameras with various tripod socket locations for connection thereto.

The bottom surface of the bracket 2 and the left hand surface of the bracket 3 (viewed from the reference frame of the operator) are adapted to flushly engage the longitudinal edge surfaces of a camera, snugly holding the cameras parallel to and flush against the respective brackets by means of the retaining screws, providing a secure mounting, yet simplified releasability for exchanging cameras.

The bracket 3 forms with the connecting bar 1, an L-shaped 90° member and depends vertically downwardly when the bar is horizontally held in the inoperative use position with the strap around the neck of the user. Handles 23 and 24 are releasably adjustably connected to the extreme rear end of the portion 14 of the bracket 2 as well as to the lower free end of the bracket 3, respectively. The handles 23 and 24 are formed as L-shaped pieces and have first connecting portions 25 and 26, respectively, which are adapted to be releasably, adjustably, and pivotally connected to the corresponding ends of the brackets by means of screws 27 and 28, respectively. The screws 27 and 28 have heads with knurled tops for ready adjustment, which heads are accessibly positioned on the side of the brackets which are opposite to the sides on which the cameras are connected. In this manner the screws may be readily djusted for pivoting of the handles into a proper comfortable position for use without interferring with the camera mounted on the opposite sides of the brackets. For example, the handles 23 and 24 may be pivotally adjusted about the screw connection point, the latter constituting the radius of pivoting.

The handles 23 and 24 are also formed with portions 29 and 30 extending parallel to the lateral sides of the cameras. Hand grips 31 and 32, which may be made of plastic or any comfortable cushioning material, such as rubber or the like, and preferably finger form fitted for ease of handling, are disposed on the handle portions 29 and 30.

In operation, the strap 11 does not have to be removed from the neck of the wearer, and may be worn about the neck for switching the cameras without interferring with the switching in any way. As shown in FIGS. 4 or 5, one or the other cameras may be operated by holding the handle adjacent that camera with the left-hand, and operating the camera with the right hand via the camera shutter button, which is on the side of the camera remote from the handle. While the camera 5 is operated, the connecting bar 1 extends vertically downwardly as may be seen in FIG. 4, with the shorter extending portion 15 of the bracket 2 extending in the front of the user, and the longer portion 14 of the bracket 2 abutting the body of the operator.

The camera 4 may be operated as shown in FIG. 5 by readily grasping the corresponding handle grip 31 with the left hand, in which position the intermediate connecting bar 1 extends horizontally and cbliquely rearwardly across the right shoulder of the operator, and the bracket 3 of the inoperative camera 5 depends vertically upwardly therefrom, causing the camera 5 to be tucked away out of use and resting on the right hand shoulder of the user via the connecting bar 1. The bracket 2 has a length such that when the camera 4 is being operated it extends horizontally in front of the neck of the operator so that the connecting bar 1 can comfortably pass over the right hand shoulder of the user. The angular orientation of the connecting bar 1 with respect to the bracket 2 permits the length of the bracket to be made as small as possible and yet permit the connecting bar 1 to pass diagonally and rearwardly toward and over the right shoulder, staying as close to the neck of the person as possible, yet with minimum dimensions of the unit and and economy in weight and bulk. In the position of FIG. 5 the camera 5 is held slightly behind the shoulder in back of the user, with the handle associated therewith at the top not interferring with the user's shoulder.

All parts of the device of the present invention thus function in a cooperative arrangement providing convenience and utility to produce the advantages of the present invention.

While only a single embodiment of the present invention has been shown and described, it will be obvious to those of ordinary skill in the art that many changes and modifications may be made thereunto without departing from the spirit and scope of the invention.

What is claimed is:

1. A three piece bracket assembly constituting a twin camera shoulder-chest-pod carrier comprising:

an intermediate connecting bar;

a first bracket integrally connected to one end of the connecting bar and a second bracket integrally connected to the other end of the connecting bar said first bracket having bracket ends thereof and connected to said connecting bar between said bracket ends thereof, said second bracket being connected at one of its ends to said other end of said connecting bar, said first bracket and said second bracket being orientated substantially cross-wise relative to each other said second bracket forming an L-shaped member with said connecting bar, said first bracket being coplanar relative to said connecting bar, defining a plane, said first bracket being inclined relative to said connecting bar and extending in a rearward direction in a rear portion thereof at an obtuse angle relative thereto, said first bracket having a front portion extending colinearly to said rear portion and forwardly relative to said connecting bar, said rear portion being substantially longer than that of said front portion said second bracket extends perpendicularly to said plane and also extends vertically downwardly relative to a horizontal orientation of said connecting bar in an inoperative position of said carrier;

means for releasably connecting a first camera to said first bracket and means for connecting a second camera releasably to said second bracket;

handle members releasably pivotally attached to a rear end of said first bracket and to a free end of said second bracket, respectively;

a cushioning hand grip disposed on each said handle member;

means for connecting a strap adjacent to the ends of said connecting bar adapted to be positioned about the neck of a person, whereby the connecting rests against the person's chest;

said intermediate connecting bar being adapted to be supported for use of said second camera extending horizontally and obliquely rearwrdly across the right shoulder of the person for operation of said second camera.

2. The twin camera shoulder-chest-pod carrier in accordance with claim 1 wherein:

said brackets each form a slot extending longitudinal along the brackets; and said connecting means comprise screws adapted to be slidably disposed in said longitudinal slots and adpted for securing releasably cameras thereto and against said brackets, respectively.

3. A three piece bracket assembly constituting a twin camera shoulder-chest-pod carrier an intermediate connecting bar;

a first bracket integrally connected to one end of the connecting bar and a second bracket integrally connected to the other end of the connecting bar; and means for releasably connecting a first camera to said first bracket and means for connecting a second camera releasably to said second bracket;

means for connecting a strap adjacent to the ends of said connecting bar adapted to be positioned about the neck of a person whereby the connecting rests against the person's chest;

said intermediate connecting bar being adapted to be supported for use of said second camera extending horizontally and obliquely rearwardly across the right shoulder of the person for operation of said second camera;

handle members releasably pivotably attached to a rear end of said first bracket and to a free end of said second bracket, respectively;

said handle members are L-shaped members and each comprise a leg portion depending perpendicularly relative to its corresponding bracket; a cushioning hand grip disposed on said leg portions.

4. The twin camera shoulder-chest-pod carrier in accordance with claim 1 further comprising:

a hand grip portion disposed around said connecting bar between the ends thereof.

* * * * *